(12) United States Patent
Ding et al.

(10) Patent No.: US 11,308,134 B2
(45) Date of Patent: Apr. 19, 2022

(54) AUTOMATIC ANALYSIS OF DIFFERENCE BETWEEN MULTI-DIMENSIONAL DATASETS

(71) Applicant: MICROSOFT TECHNOLOGY LICENSING, LLC, Redmond, WA (US)

(72) Inventors: Rui Ding, Redmond, WA (US); Zhouyu Fu, Redmond, WA (US); Shi Han, Redmond, WA (US); Haidong Zhang, Redmond, WA (US); Dongmei Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 155 days.

(21) Appl. No.: 16/620,381

(22) PCT Filed: May 23, 2018

(86) PCT No.: PCT/US2018/034018
§ 371 (c)(1),
(2) Date: Dec. 6, 2019

(87) PCT Pub. No.: WO2018/226405
PCT Pub. Date: Dec. 13, 2018

(65) Prior Publication Data
US 2020/0183955 A1 Jun. 11, 2020

(30) Foreign Application Priority Data
Jun. 9, 2017 (CN) .......................... 201710433307.4

(51) Int. Cl.
*G06F 16/28* (2019.01)
*G06F 16/22* (2019.01)
*G06F 16/248* (2019.01)

(52) U.S. Cl.
CPC ........ *G06F 16/288* (2019.01); *G06F 16/2264* (2019.01); *G06F 16/248* (2019.01); *G06F 16/285* (2019.01)

(58) Field of Classification Search
CPC .. G06F 16/288; G06F 16/285; G06F 16/2264; G06F 16/248
(Continued)

(56) References Cited

U.S. PATENT DOCUMENTS 6,003,036 A 12/1999 Martin
6,714,940 B2 3/2004 Kelkar
(Continued)

FOREIGN PATENT DOCUMENTS

CN 102007510 A * 4/2011 ............. G06Q 50/04
CN 102007510 A 4/2011
(Continued)

OTHER PUBLICATIONS

"First Office Action and Search Report Issued in Chinese Patent Application No. 201710433307.4", dated Apr. 28, 2021, 14 Pages.
(Continued)

*Primary Examiner* — Dung K Chau

(57) ABSTRACT

According to implementations of the subject matter described herein, there is proposed a solution for automatic analysis of a difference between multi-dimensional datasets. In this solution, an analysis request is received for a first dataset and a second dataset, each of which including data items corresponding to a plurality of dimensions. In response to the analysis request, data items corresponding to a first dimension in the first and second datasets are compared. Based on the comparison, a first set of influence factors associated with the first dimension are determined, each influence factor indicating a reason for a difference between the first and second datasets from a respective
(Continued)

perspective. An analysis result related to the difference between the first and second datasets is presented based on the first set of influence factors. In this way, it is possible to achieve automatic and efficient analysis of the difference between the different datasets.

20 Claims, 7 Drawing Sheets

(58) Field of Classification Search
USPC .......................................................... 707/722
See application file for complete search history.

(56) References Cited

U.S. PATENT DOCUMENTS

| | | | |
|---|---|---|---|
| 7,765,216 | B2 | 7/2010 | Li et al. |
| 9,070,226 | B2 | 6/2015 | Mande et al. |
| 9,639,814 | B2 | 5/2017 | Gould et al. |
| 2003/0009470 | A1 | 1/2003 | Leary |
| 2011/0145168 | A1* | 6/2011 | Dirnstorfer ............ G06Q 40/06 705/36 R |
| 2011/0178831 | A1* | 7/2011 | Ravichandran .... G06Q 30/0251 705/7.11 |
| 2014/0258311 | A1 | 9/2014 | Hamborg et al. |
| 2016/0109297 | A1 | 4/2016 | Furukawa |
| 2016/0125456 | A1* | 5/2016 | Wu .................... G06Q 30/0251 705/14.49 |
| 2017/0086697 | A1 | 3/2017 | Bellock et al. |
| 2017/0309092 | A1* | 10/2017 | Rosenbaum ........ G01M 17/007 |
| 2018/0018719 | A1* | 1/2018 | Cao .................... G06Q 30/0282 |

FOREIGN PATENT DOCUMENTS

| | | |
|---|---|---|
| CN | 103823974 A | 5/2014 |
| CN | 104346341 A | 2/2015 |
| CN | 105095473 A | 11/2015 |
| CN | 105138612 A | 12/2015 |
| CN | 105260616 A | 1/2016 |
| CN | 105447323 A | 3/2016 |
| JP | H0921693 A | 1/1997 |
| JP | 2009-258890 A | 11/2009 |
| WO | 0108039 A2 | 2/2001 |
| WO | 2017000114 A1 | 1/2017 |

OTHER PUBLICATIONS

"Office Action Issued in European Patent Application No. 18773289.6", dated Mar. 2, 2021, 6 Pages.

Sarawagi, Sunita, "Explaining Differences in Multidimensional Aggregates", In Proceedings of the 25th International Conference on Very Large Data Bases, Sep. 7, 1999, 12 Pages.

International Search Report and Written Opinion for PCT/US2018/034018, dated Oct. 23, 2018.

"Second Office Action Issued in Chinese Patent Application No. 201710433307.4", dated Nov. 26, 2021, 8 Pages. (W/o English Translation).

Zhang, et al., "Study on the Factors Influencing Film Satisfaction", Published by China Academic Journal Electronic Publishing House, Nov. 2013, 6 Pages.

Lu, et al., "Research on Visualization of Multidimensional Data", In Journal of Communication University of China (Science and Technology), vol. 24, Issue 2, Apr. 30, 2017, 8 Pages.

* cited by examiner

US 11,308,134 B2

AUTOMATIC ANALYSIS OF DIFFERENCE BETWEEN MULTI-DIMENSIONAL DATASETS

This application is a U.S. National Stage Application of PCT/US2018/034018, filed May 23, 2018, which claims priority to Chinese Patent Application No. 201710433307.4, filed Jun. 9, 2017, which applications are hereby incorporated by reference. To the extent appropriate, a claim of priority is made to each of the above disclosed applications.

BACKGROUND

In the present information era, data is everywhere and increases both in amount and dimension as available data sources are continuously growing. Data analysis or data exploration aims to mine information of interest by users from multi-dimensional data and plays an increasingly important role in many applications such as data mining and business intelligence. In many scenarios, users are interested in data changes of different datasets and expected to learn the reasons related to the changes. However, currently there is no solution for automatically and effectively analyzing a reason related to a difference between different multi-dimensional datasets. Users may need to specify how to divide the multi-dimensional datasets into subsets with fewer dimensions and then manually explore the respective subsets of small data amount. Such analysis process is neither efficient nor with high accuracy. Therefore, the challenge for data analysis is how to provide an analysis result to users fast and accurately in front of a vast amount of data.

SUMMARY

According to implementations of the subject matter described herein, there is proposed a solution for automatic analysis of a difference between multi-dimensional datasets. In this solution, an analysis request is received for a first dataset and a second dataset, each of the first and second datasets including data items corresponding to a plurality of dimensions. In response to the analysis request, data items corresponding to a first dimension of the plurality of dimensions in the first and second datasets are compared. Based on the comparison, a first set of influence factors associated with the first dimension are determined, each of the first set of influence factors indicating a reason for a difference between the first and second datasets from a respective perspective. An analysis result related to the difference between the first and second datasets is presented based at least in part on the first set of influence factors. In this way, it is possible to achieve automatic and efficient analysis of the difference between the different datasets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, same or similar reference symbols refer to the same or similar elements.

DETAILED DESCRIPTION

Figure 1:
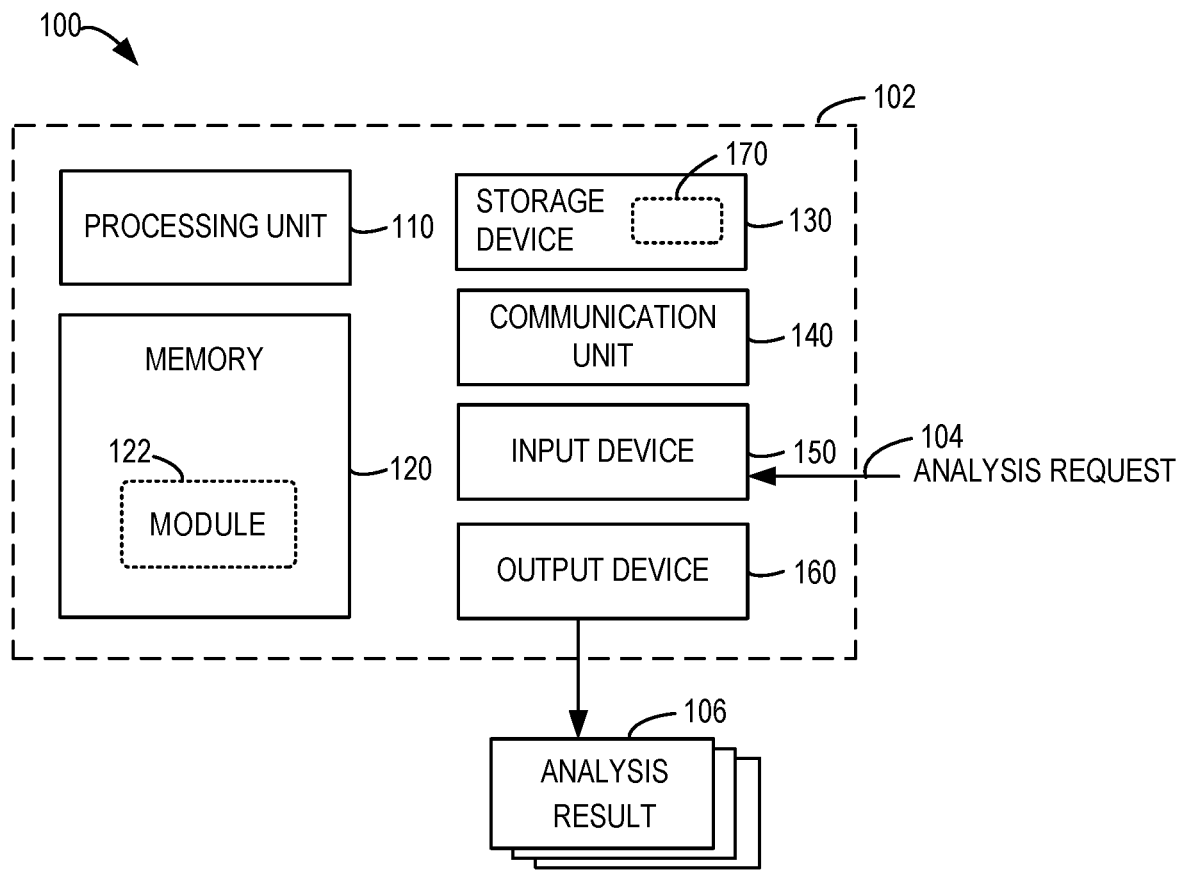
FIG. 1 illustrates a block diagram of a computing environment in which various implementations of the subject matter described herein can be implemented.

The subject matter described herein will now be discussed with reference to various example implementations. It would be appreciated these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, either explicit or implicit, may be included below.

As used herein, the term "dimension" refers to a certain category or type of data in a dataset or data subset. Dimensions are used to group different types of data in a dataset or data subset. A multi-dimensional dataset include data in multiple dimensions. As an example, a dataset related to movie box office revenues may include data related to the box office revenue, release data, release venue, movie title, movie genre, movie rating and so on, where "box office revenue," "release data," "release venue," "movie title," "movie genre" and "movie rating" refer to six different dimensions of the dataset. Data in these dimensions form a corresponding dataset.

As used herein, the term "data item" refers to unit data in each dimension of a dataset. A data item in one dimension can also be referred to as a dimension value of the dimension. The meaning of each data item can be indicated by its dimension and other one or more dimensions that define the data item. For instance, in the dataset related to movie box office revenues, each data item may indicate a given box office revenue in the dimension of "box office revenue." This data item can also be interpreted by other dimensions so as to represent the box office revenue of a movie of a given rating that has a particular genre and is released at some release venue on a certain release date. In the dataset that only includes two dimensions, i.e., "box office revenue" and "release date," data items in the dimension of "box office revenue" can only indicate box office revenues on specific release dates.

Generally, a data item can be a categorical data item, a sequential data item, or a metric data item. For instance, data items in the dimensions of "release venue," "movie title," "movie genre" and "movie rating" belong to categorical data items; data items in the dimension of "release date" belong to sequential data items; while data items in the dimension of "box office revenue" reflect quantitative attributes related to statistics and thus belong to metric data items. The metric data items usually are numerical values.

A multi-dimensional dataset can be divided into different data subsets, which are also referred to as subspaces of the dataset and can be defined by a plurality of dimensions of the multi-dimensional dataset and specific data items in these dimensions. That is, each data subset can be defined by one or more pairs of <dimension, data item> and include all data of other dimensions apart from the dimensions that defines the subset. Data of other dimensions included in each data subset is determined by the pairs of <dimension, data item> that define the data subset. It would be appreciated that various data splitting techniques can be used to divide data subsets from the multi-dimensional dataset. For example, in the above example related to the movie box office revenues, the multi-dimensional dataset can be divided into different data subsets according to different release dates in the dimension of "release date," each including all data of other dimensions except for the dimension of "release date." In a further example, different data subsets can also be divided according to two dimensions of "release time" and "release venue," such that each of the data subsets corresponds to a specific release time and a specific release venue and includes data of other dimensions apart from the two dimensions.

In multi-dimensional datasets that provide various types of data, users may be interested in data changes (especially transition of metric data) among different multi-dimensional datasets consisting of the same type of data and therefore expect to explore the reasons for such data changes. For instance, a user may observe that the movie box office revenue of a given day increases significantly compared with the day before, and she/he expects to acquire the possible reasons that result into such increase. Currently, there are no effective data analysis tools that are capable of automatically providing reliable and accurate cause analysis for users. Instead, users may need to manually view the data from different dimensions of the multi-dimensional dataset related to box office revenues. This analysis process is inefficient and can hardly acquire reliable and accurate results as well.

According to implementations of the subject matter described herein, there is proposed a solution for analyzing multi-dimensional data. In the solution, corresponding data items of two datasets in the same dimension are compared in response to receiving an analysis request for the two datasets and one or more influence factors associated with the dimension are determined based on the comparison, where each influence factor indicates a reason for a difference between the two datasets from a respective perspective. Based on the determined influence factors, an analysis result related to the difference between the two datasets can be presented. Through this solution, the analysis of the difference between the two datasets is provided from separate dimensions and the analysis of the difference can be determined by matching with the predefined influence factors. In this way, it is possible to achieve automatic and efficient analysis of differences between different datasets from individual dimensions.

Basic principles and several example implementations of the subject matter described herein will be described with reference to the drawings.

Example Environment

FIG. 1 illustrates a block diagram of a computing environment 100 in which various implementations of the subject matter described herein can be implemented. It would be appreciated that the computing environment 100 illustrated in FIG. 1 is only an example and should not considered as any limitations on the functions and scope of the implementations described herein.

As shown in FIG. 1, the computing environment 100 includes a computing system/server 102 in form of a general-purpose computing device. The computing system/server 102 can be used for performing data analysis of implementations of the subject matter described herein (also referred as a "data analysis device 102"). The computing system/server 102 can receive an analysis request 104 and provide an analysis result 106. Components of the computing system/server 102 can include, but are not limited to, one or more processors or processing units 110, a memory 120, a storage device 130, one or more communication units 140, one or more input devices 150 and one or more output devices 160. The processing unit 110 can be a physical or virtual processor and can execute various processing based on programs stored in the memory 120. In a multi-processor system, a plurality of processing units execute computer-executable instructions in parallel to improve parallel processing capability of the computing system/server 102.

The computing system/server 102 generally includes various computing storage medium. The medium can be any obtainable medium accessible by the computing system/server 102, including but not limited to volatile and non-volatile medium, removable and non-removable medium. The memory 120 can be a volatile memory (e.g., a register, cache and a random-access memory (RAM)), a non-volatile memory (e.g., a read-only memory (ROM), an electrically erasable programmable read-only memory (EEPROM), a flash) or some combinations thereof. The memory 120 can include one or more program modules 122 configured to perform functions of various implementations described herein.

The storage device 130 may be a removable and non-removable medium, including a machine-readable medium, such as an internal storage, a flash drive, a disk or any other media capable of storing information and/or data 170 (e.g., one or more multi-dimensional datasets) and accessible within the computing system/server 102. The module 122 can analyze part or all of the data 170. In some implementations, instead of being stored in the storage device 130, part or all of the data 170 can be stored together with the module 122 in the memory 120 with a high access speed. It would be appreciated that the above description is only exemplary and the data 170 can be also be stored in any other suitable forms of memory. In one example, the data 170 can be stored in multiple storage devices in a distributed manner.

The computing system/server 102 may further include additional removable/non-removable, volatile/non-volatile storage medium. Although not illustrated in FIG. 1, there can also be provided a disk drive for reading from or writing into a removable and non-volatile disk and an optic disk drive for reading from or writing into a removable and non-volatile optic disk. In these cases, each drive can be connected to a bus (not shown) via one or more data medium interfaces.

The input device 150 can be one or more of a variety of input devices, for example, a mouse, a keyboard, a trackball, a voice input device, and the like. The output device 160 can be one or more of a variety of output devices, such as a display, a loudspeaker, a printer, and the like. By means of the communication 140, the computing system/server 102 can further communicate with one or more external devices (not shown) such as the storage devices and display devices, communicate with one or more devices enabling the user to interact with the computing system/server 102, or any devices (such as a network card, a modem and the like) enabling the computing system/server 102 to communicate with one or more other computing devices, if required. Such communication can be executed by an input/output (I/O) interface (not shown).

The communication unit 140 communicates with a further computing device via the communication medium. For example, the computing system/server 102 can further communicate via the communication unit 140 with a remote database having data stored therein. The data can be a copy of the data 170, including a part of the data 170, or data different from the data 170. In some implementations, the storage device 130 may not store the data 170 but can retrieve the data via the communication unit 140 from an external database. Furthermore, the functions of the components of the computing system/server 102 can be implemented by a single computing cluster or multiple computing machines that can communicate via communication connections. Therefore, the computing system/server 102 can operate in a networked environment using a logic connection to one or more other servers, personal computers (PC) or a further general network node.

Principles and Examples

Figure 2:
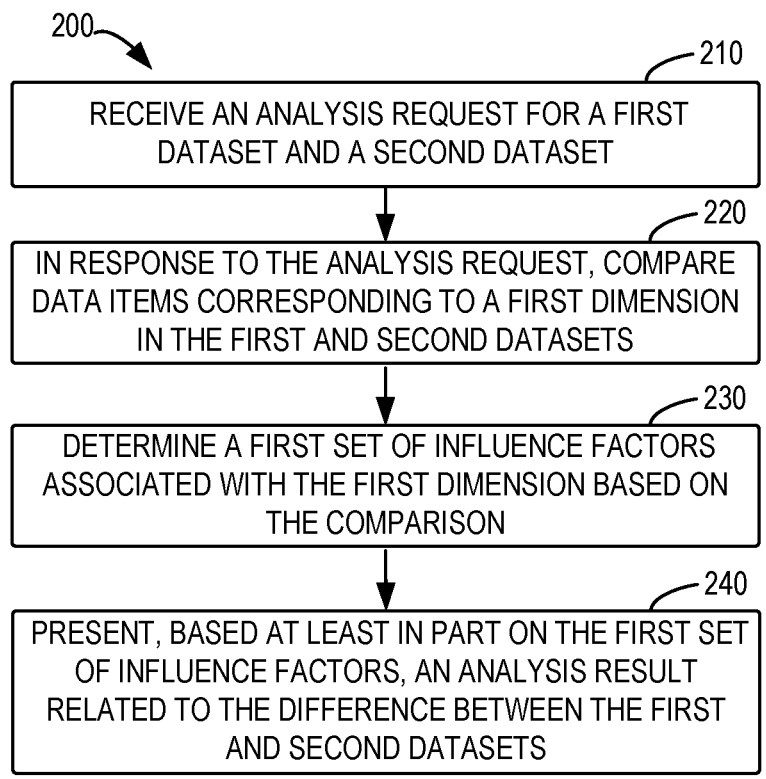
FIG. 2 illustrates a flowchart of a data analysis process in accordance with an implementation of the subject matter described herein.

FIG. 2 shows a flowchart of an overall process 200 of data analysis in accordance with an implementation of the subject matter described herein. The process 200 can be implemented at the data analysis device 102, e.g., at the module 122. At 210, the data analysis device 102 receives an analysis request 104 for a first dataset and a second dataset. The received analysis request 104 indicates that it is expected to perform a data analysis task on the first and second datasets. The analysis of different datasets generally aims to explore the reasons for differences between different datasets. The data to be analyzed in the first and second datasets may involve metric data related to numerical values, or categorical data or sequential data that can be represented by numerical values. The differences may be related to aspects including an increase in the numerical values, a decrease in the numerical values, individual abnormal values, or other types of data.

The first and second datasets may include data items corresponding to two or more dimensions. The first and second datasets may be related to the same type of data, but the data included therein may vary. For example, both the first and second datasets may include data related to movie box office revenues. In some implementations, the first and second datasets can be independently pre-stored in the data analysis device 102 or acquired by the device from an external data source. In further implementations, the first and second datasets may be two different data subsets from a larger multi-dimensional dataset (or multi-dimensional data superset). For example, the first and second datasets may be defined by different data items corresponding to one or some dimensions of the larger multi-dimensional data superset, such that the first and second datasets may include all data items corresponding to other dimensions of the multi-dimensional dataset. In some implementations, the first and second datasets to be analyzed can be specified by the user or via a predetermined system configuration from the multi-dimensional data superset.

For the purpose of illustration, some implementations of the subject matter described herein will be described with reference to specific dataset examples. It would be appreciated that implementations of the subject matter described herein can also be implemented on any other datasets. In some examples, it is assumed that both the first dataset and second dataset come from a larger dataset (or referred to as a multi-dimensional data superset) related to movie box office revenues, and the multi-dimensional data superset includes data in the following six dimensions: "box office revenue," "release data," "release venue," "movie title," "movie genre" and "moving rating." In this example, the dimension of "box office revenue" includes metric data, and thus it may be expected to analyze the reasons for an increase, a decrease and differences of box office revenues on various dates.

Figure 3:
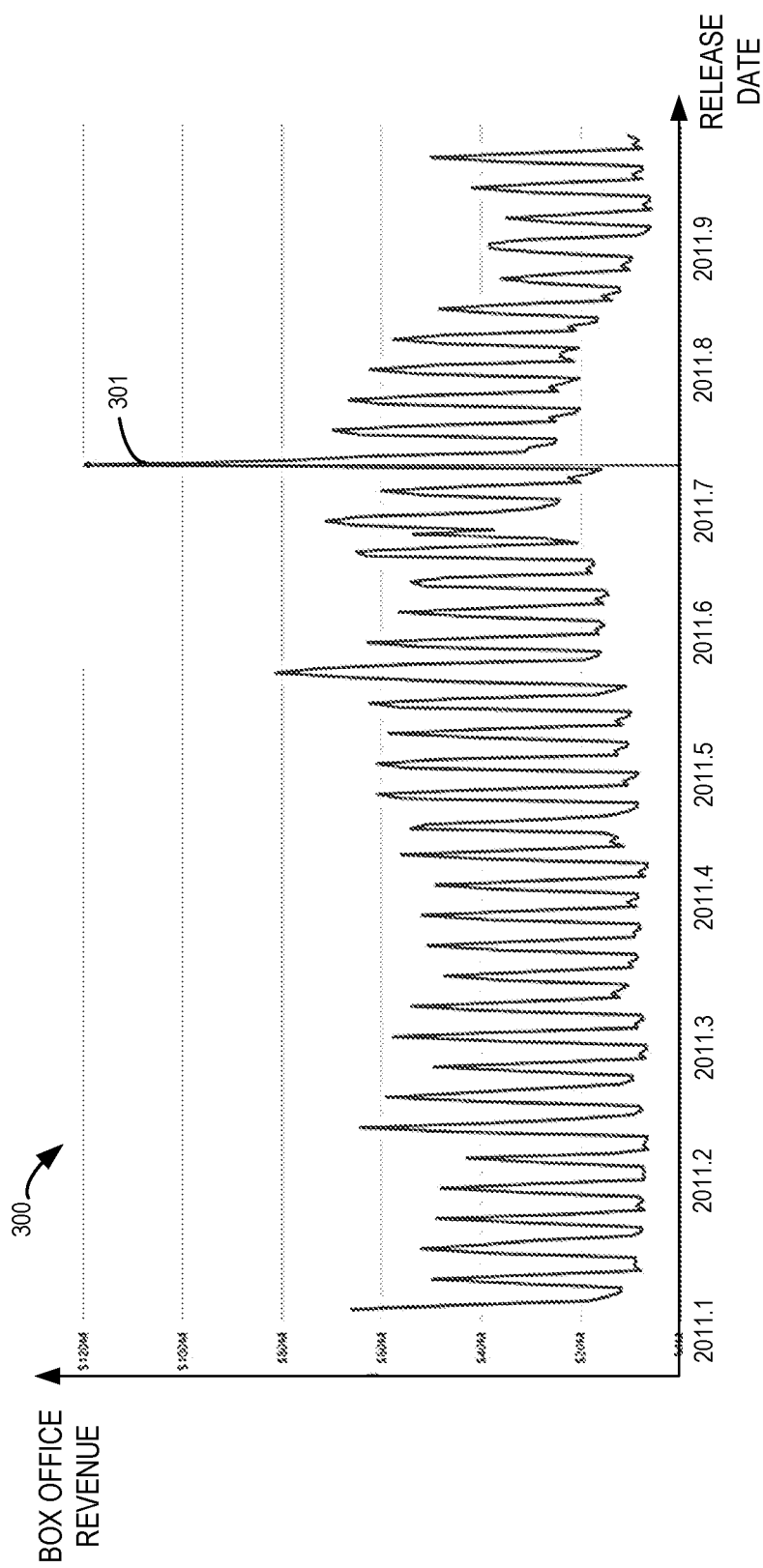
FIG. 3 illustrates an example of a data subset in accordance with an implementation of the subject matter described herein.

FIG. 3 shows a plot 300 illustrating data in the dimensions of "release date" and "box office revenue" within the multi-dimensional dataset. It can be seen from this perspective that the box office revenue varies along with the release dates. In this example, the users may expect to analyze the reasons for a sudden increase of the box office revenue 31 on Jul. 15, 2011, thereby requesting to analyze a difference of box office revenues between July 15 and July 14. At this time, a first dataset and a second dataset are divided from the multi-dimensional data superset based on the two dates, and the first and second datasets include data related to the box office revenue on the two dates, respectively, which data include all data of other dimensions except for "release date." In addition to the user input, the two datasets to be analyzed may also be determined by a predetermined configuration. For instance, in response to an analysis request, it can automatically identify, based on the predetermined configuration, that changes of box office revenues between a date that may interest the users or is specified by the users (e.g., July 15) and some date before or after the date can be analyze and thus the two datasets for analysis can be divided accordingly.

Still referring to FIG. 2, at 220, the data analysis device 102 compares data items corresponding to a first dimension in the first and second datasets in response to the analysis request 104. As mentioned above, the first and second datasets may each include data items corresponding to a plurality of dimensions. To analyze the overall difference appeared in the data items of the first and second datasets, data items corresponding to individual dimensions can be reviewed and compared from perspectives of the individual dimensions, so as to attempt to find the potential reasons that influence the overall difference. A dimension of the plurality of dimensions of the first and second datasets, which can be used for analyzing the reasons that influence the overall difference, can sometimes be referred to as a potential influence dimension. For example, in the first and second datasets including the dimensions of "box office revenue," "release venue," "movie title," "movie genre" and "movie rating," the other dimensions may all be regarded as dimensions available for analysis except for the dimension of "box office revenue" in which the difference is expected to be analyzed.

In the implementations of the subject matter described herein, a dimension (referred to as a first dimension) can be selected form a plurality of dimensions and data items related to the selected dimension in the first and second datasets are compared. The first dimension can be specified by users or selected automatically. For example, the dimension of "movie title" may be used as the first dimension for analysis of the two datasets and box office revenue data corresponding to "movie title" in the first and second datasets are data items for comparison. It is assumed that the data items corresponding to the first dimension in the first dataset are denoted as a list L1={x1, x2, . . . , xn} and the data items corresponding to the first dimension in the second dataset are denoted as a list L2={y1, y2, . . . , yn}, where n refers to the number of data items in each dataset. The two lists L1 and L2 are data items for comparison when the analysis is performed in the first dimension, where xi and yi (i∈{1, 2, . . . , n}) indicate box office revenues corresponding to movie i in the first and second datasets, respectively. It is to be noted that two datasets usually have data items in a one-to-one correspondence relationship at any dimensions (values of data items may vary), so the number of data items in the two datasets can be identical for each dimension. Even if a corresponding data item is not present in a given dataset, it can be set as 0 or null so as to maintain the same amount.

According to implementations of the subject matter described herein, performing the comparison process for the first and second datasets from a single dimension help obtain a comparison result that facilitates analyzing the reasons that can possibly be provided by the dimension and is related with the difference between the first and second datasets. Therefore, at 230, the data analysis device 102 determines a first set of influence factors associated with the first dimension based on the comparison at 220, each influence factor indicating a reason for the difference between the first and second datasets from a respective perspective.

In some implementations, a plurality of influence factors can be predefined to indicate the reasons for differences between datasets from different perspectives. The influence factors can explain reasons for differences from perspectives of an increase or decrease trend, abnormal or extreme point data, contributions to the increase or decrease trend, and the like. The comparison result of the first and second datasets can be used to assist in determining whether the difference between the two datasets can be interpreted by one or more of the predefined influence factors. The one or more determined influence factors form a first set of influence factors associated with the first dimension. Some examples of the influence factors will be introduced below and the comparison process will be further discussed in details.

At 240, the data analysis device 102 presents, based at least in part on the first set of influence factors, an analysis result 106 related to the difference between the first and second datasets. The analysis result 106 can be presented to the users via the output device 160 of the data analysis device 102 for example. Based on the reasons indicated by the influence factors, the analysis result 106 presents to the users detailed contents related to the difference between the first and second datasets. For example, if the determined influence factors interpret the reasons for the difference from the perspective of an increase trend between data of the first and second datasets, an analysis result is presented to indicate an increase amplitude in the first dimension of the first and second datasets. The presentation of the analysis result will be described in details below.

The example implementations of comparing and analyzing the first and second datasets from the first dimension have been discussed. In some implementations, if the first and second datasets include a plurality of influencing dimensions, the comparison and the determination of associated influence factors for each of the plurality of influencing dimensions can be iteratively performed according to a manner similar to the above first dimension. For example, for a second one of the plurality of dimensions, the data analysis device 102 may further compare data items corresponding to the second dimension in the first and second datasets and determine a second set of influence factors associated with the second dimension based on the comparison. In the above example of datasets related to movie box office revenue, assuming that the second dimension is "movie genre," data of box office revenues data corresponding to "movie genre" in the first and second datasets can be compared to obtain a set of influence factors associated with "movie genre." In some implementations, for one or some dimensions, it may be impossible to determine possible influence factors based on the comparison result. Therefore, it can be continued to compare data items corresponding to other dimensions.

If different sets of influence factors (for example, the first and second sets of influence factors) associated with different dimensions are obtained based on the comparison, the data analysis device 102 can for one or some dimensions an analysis result related to differences between the first and second datasets based on the determined influence factors associated with each dimension. For example, the data analysis device 102 can determine one factor, some factors, one or more sets of factors or all influence factors from these sets of influence factors for presenting the analysis result. Presentation of the analysis result will be described in details in the following.

By iteratively comparing the data items from different dimensions of the datasets, the reasons for the difference between the datasets can be analyzed comprehensively from several aspects, thereby providing a more accurate and abundant analysis result.

Examples of Influence Factors

In implementations of the subject matter described herein, the analysis request 104 is aimed to request analyzing the difference between the first and second datasets. To interpret the reasons for the difference, one or more influence factors can be predefined to indicate possible reasons that are used for interpreting the difference between datasets from different perspectives. The reasons for the difference can be interpreted from perspectives of an increase or decrease trend between the datasets, the abnormal or extreme point data, and the contributions of data items in different datasets to the increase or decrease trend, and the like. After the comparison of one or more dimensions, a set of influence factors associated with each dimension can be determined based on the comparison result.

In some implementations, the predefined influence factors can be divided into four categories, including a category of negative correlation, a category of cross-origin regression, a category of general regression, and a category of individual analysis. Each category may include one or more corresponding influence factors. Influence factors in the category of negative correlation may indicate the following situation: when one of the first and second datasets is regarded as a target dataset and the other is a reference dataset, data of the target dataset presents a negative correlation with respect to data of the reference dataset in a certain dimension. The category of cross-origin regression indicates some influence factors in the following situation: there is an overall proportional increase trend in data items corresponding to the first dimension in the first and second datasets. The general regression indicates some influence factors in the following situation: other trends except for the negative correlation and overall proportional increase trends, such as a disproportionate increase trend with an intercept. The category of individual analysis includes possible influence factors that can be used to analyze from the perspective of individual data items.

Table 1 below lists some possible influence factors included in the above categories.

TABLE 1

List of influence factors

| Category | Influence factor | Index | Description |
| --- | --- | --- | --- |
| Negative correlation | Negative correlation level | 0 | A negative relationship and/or a degree of the negative correlation |
| | Outlier | 1 | Indicating outliers beyond a regression fitting of the negative correlation |
| Cross-origin regression | Positive outlier | 2 | Indicating data items that make significant contributions to an increase or decrease trend in the two datasets |
| | Negative outlier | 3 | Indicating data items that contribute to intensifying the difference in an increase or decrease trend in the two datasets |
| | Extreme points in a regression | 4 | Indicating extremely large numerical values on the regression fitting line |
| | Direction of a regression fitting | 5 | Indicating whether an increase or decrease trend of most data items, which can be used to determine whether it complies with the overall increase or decrease trend (difference) of the two datasets |
| General regression | Positive outlier | 2 | Same as the above factor 2 |
| | Negative outlier | 3 | Same as the above factor 3 |
| | Extreme points in a regression | 4 | Same as the above factor 4 |
| | Direction of a regression fitting | 5 | Same as the above factor 5 |
| | Intercept of a regression fitting | 6 | Indicating a general increase or decrease (disproportionate) of a particular amount, the direction of the intercept (whether the intercept is positive or negative) being used to determine whether the increase or decrease of the particular amount is compliant with the overall trend, while the absolute value of the intercept indicating the size of the particular amount |
| Individual analysis | Positive data item | 7 | Similar to the above factor 2 |
| | Negative data item | 8 | Similar to the above factor 3 |
| | Extreme-point data item | 9 | Similar to the above factor 4 |

In Table 1, individual values or data items indicated by the influence factors correspond to relevant dimension values of the influencing dimension for analysis (e.g., the first or second dimension). For example, when the first and second datasets are analyzed from the dimension of "movie title," influence factors (e.g., influence factors indicated by indexes 1-4 and 7-9) related to individual outlier or other data items may correspond to some movies in the dimension of "movie title." The influence factors related to the overall correlation or trend (such as the influence factors indicated by indexes 0, 5 and 6) indicate that there is an overall correlation or trend appeared in the dimension for analysis (e.g., in almost all movies). For the sake of understanding the above influence factors, the following Table 2 provides example situations in which the influence factors may help interpret the differences between datasets. It would be appreciated that the examples are provided merely for better understanding and other examples may also exist based on the specific dataset to be analyzed.

TABLE 2

Examples that influence factors are used for interpretation

| Influence factor | Index | Example |
| --- | --- | --- |
| Negative correlation | 0 | From the perspective of the movie title, there is a fact of waxing and waning for almost every movie during the two dates. (The possible reason is that all cinemas distribute a fixed number of viewing tickets to users for each movie and the tickets can only be used once either on July 15 or on July 14. For any movie, if more people come to see the movie on July 14, then less people will come on July 15; and if less people come to see the movie on July 14, then more people will come on July 15. Because there are multiple movies, some movies will have better box office on July 14 than July 15 and other movies will have better box office on July 15 than July 14, which shows that the movie box office is inversely correlated on July 14 and July 15.) In another practical example, when overall sales differences of the two products X and Y are analyzed, the "negative correlation" may help explain to the users that the two products have been negatively correlated with each other in many years because if the consumers have already purchased one of the product, they do no need to purchase the other one. |
| Outlier | 1 | Still referring to the above example, although there is a waxing and waning fact for most of the movies during the two dates, box office revenues of several movies appears different from other movies on the two dates because there are no viewing tickets for these movies. In the above example related to product sales, it may observe that the sales of the two products appear differently in a certain year, e.g., both of the two products have extremely high sales in a certain year. |
| Positive outlier | 2 | Although the overall box office revenue on Jul. 15, 2011 is higher than the day before, the box office revenue of movie A is particularly high on Jul. 15, 2011. |
| Negative outlier | 3 | Although the overall box office revenue on Jul. 15, 2011 is higher than the day before, the box office revenue of movie B is particularly high on the day before. |
| Extreme points in regression | 4 | The overall box office revenue on Jul. 15, 2011 is higher than the day before, where the box office revenue of the movies with the science fiction genre is particularly high on Jul. 15, 2011. |
| Direction of regression fitting | 5 | Although the overall box office revenue on Jul. 15, 2011 is higher than the day before, the box office revenues of movies with most other genres are higher on July 14. |
| Positive outlier | 2 | Same as the above factor 2 |
| Negative outlier | 3 | Same as the above factor 3 |
| Extreme points in a regression | 4 | Same as the above factor 4 |
| Direction of a regression fitting | 5 | Same as the above factor 5 |
| Intercept of a regression fitting | 6 | The overall box office revenue on Jul. 15, 2011 is higher than the day before because the box office revenue of each movie on July 15 is higher than the day before by a given amount (denoted by a positive intercept value) |

TABLE 2-continued

Examples that influence factors are used for interpretation

| Influence factor | Index | Example |
| --- | --- | --- |
| Positive data item | 7 | Similar to the above factor 2 |
| Negative data item | 8 | Similar to the above factor 3 |
| Extreme-point data item | 9 | Similar to the above factor 4 |

The above summarizes some influence factors that may make a sense when being used to explain differences between datasets. It would be appreciated that other influence factors can also be defined as required to interpret the differences between different datasets.

Comparison of Data Items and Determination of Influence Factors

As mentioned above, to determine influence factors that can be associated with one or more dimensions of the dataset for interpreting the difference between the first and second datasets, the data analysis device 102 compares the data items corresponding to one or more influencing dimensions in the first and second datasets. A variety of methods can be employed for perform the comparison of data items, such that the comparison result can be used to facilitate the determination of the predefined influence factors (for example, those as listed above). In some implementations, data items are compared by employing methods of regression fitting, clustering, identification of individual outlier data items and the like. For example, the results obtained by the comparison method of regression fitting can facilitate determining one or more influence factors from the category of negative correlation, the category of cross-origin regression and the category of general regression as listed in the above Table 1. The result obtained from the comparison method of clustering and direct identification of individual outlier data items can facilitate determining one or more influence factors from the category of individual analysis as listed in the above Table 1.

In some implementations, some or all of the comparison methods can be combined or used separately to perform the comparison. The individual methods or different combinations of several methods used in the comparison can form different analysis policies during the data item comparison. In some implementations, the selection of the analysis policies can be determined based on analysis intents of the users with respect to the difference between the first and second datasets. Depending on the varying of the analysis intent, different analysis policies are employed in comparing the data items, so as to facilitate determining more accurate and meaningful influence factors to interpret the difference between the first and second datasets. The analysis intents for the first and second datasets may belong to one of the following two situations.

In one situation, if the overall difference of the first and second datasets is larger, it can be determined that the user tends to find out whether there are individual data items that impact the difference. The overall difference of the first and second datasets is determined by observing whether there is a significant difference (e.g., the amount of increase or decrease) between the two data items defining the datasets in the multi-dimensional data superset including the two datasets, then it can determine that the user tend to find out whether there are individual data items that impact the difference. For example, in the example of FIG. 3, the total box office revenue on Jul. 15, 2011 is significantly greater than that on the day before as indicated by 301. The analysis intents of the users may lie in exploring some individual data items that affect the sudden increase from the datasets related to the two dates.

In another situation, if the overall difference of the first and second datasets is smaller or substantially the same, it can focus on analyzing whether there is a meaningful trend or there are individual data items that affect the difference in a certain dimension of the first and second datasets. For instance, in the example of FIG. 3, if it is observed that there is no significant difference between box office revenues of the two dates, the users may expect to know the possible reasons behind the fact, which can be analyzed from the perspective such as whether respective box office revenue data corresponding to other dimensions has a change trend or outlier data items.

In some implementations, the analysis intents of the users can be determined by selecting types for the analysis requests and then different analysis policies are further employed based on the analysis intents in the comparison of data items. The above first situation may correspond to an analysis request of a first type and the second situation may correspond to an analysis request of a second type. For instance, the user may input an analysis request of the first type into the data analysis device 102 by selecting for example the option of "Please explain increase/decrease of data," which request indicates that the user may focus on analyzing the above first situation. The user may also input the analysis request of the first type into the data analysis device 102 for example by selecting the option of "Please explain what is the difference among data," which request indicates that the user may focus on analyzing the above second situation. In further implementations, the analysis intents corresponding to the received analysis request may also be determined by automatically determining the difference between two data items (e.g., box office revenues of the two dates in FIG. 3) that define the first and second datasets, and thus the corresponding analysis policies can be used upon performing the comparison of data items.

In addition to the types of analysis requests or as an alternative, different analysis policies can also be employed based on the number of to-be-analyzed data items corresponding to respective dimensions. In some dimensions, the number of data items to be compared may be small and meaningful results cannot be obtained from the comparison performed by the methods such as clustering and regression fitting. Therefore, additional analysis policies may be needed to perform the comparison such that the comparison result can identify one or more predefined influence factors.

Figure 4:
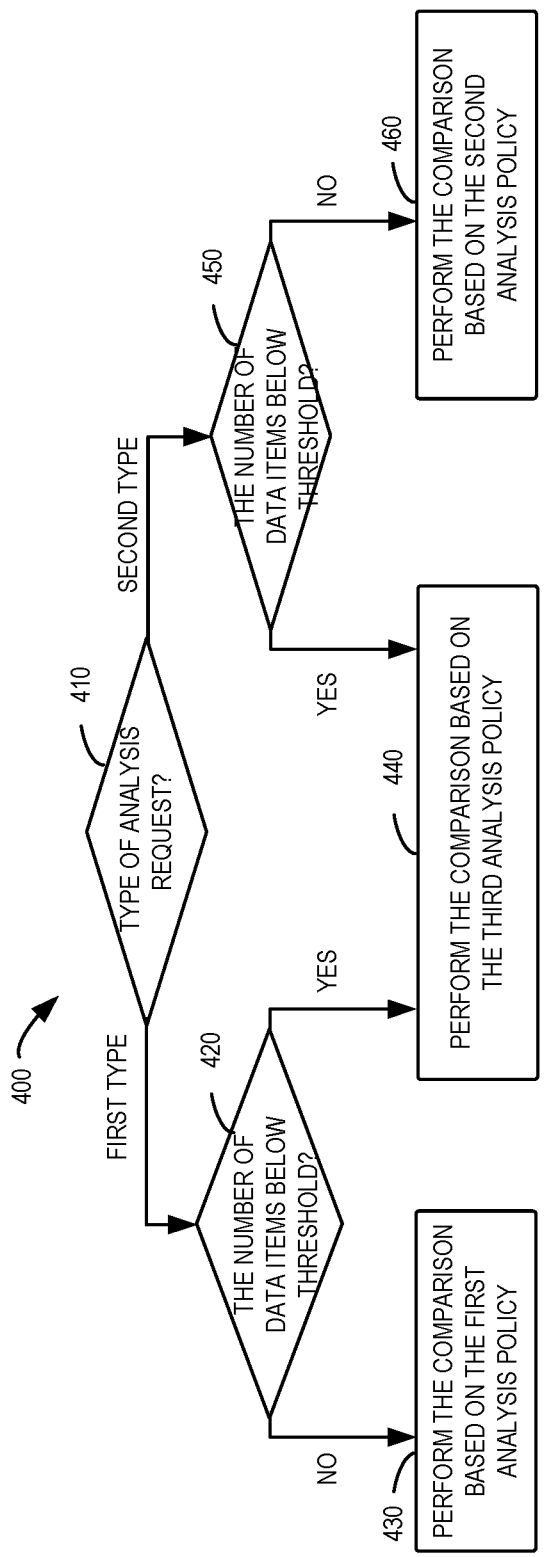
FIG. 4 illustrates a flowchart of a process of comparing data items in accordance with an implementation of the subject matter described herein.

FIG. 4 shows a process 400 for data item comparison in accordance with an implementation of the subject matter described herein. The process 400 determines an analysis policy for data item comparison from two aspects, i.e., the type of the analysis request and the number of the data items to be analyzed. The process 400 can be regarded as a specific example of the comparison step at 220 in the process 200. It would be noted that the process 400 can be adopted to perform the comparison for each dimension to be analyzed in the first and second datasets. In the implementation of FIG. 4, based on the type of the analysis request and the number of data items, one of the first, second and third analysis policies can be determined for performing the comparison.

At 410, the data analysis device 102 determines a type of the received analysis request. If the analysis request is a first type (e.g., indicating an intent of analyzing a large difference between the first and second datasets), the data analysis device 102 determines at 420 whether the number of data items is below a threshold. The number of data items refers to the number of data items corresponding to a particular dimension to be analyzed in the first and second datasets. For example, in the above exemplary first and second datasets provided by FIG. 3, data item lists L1 and L2 corresponding to the dimension of "movie title" have n data items. If the number of data items is larger (e.g., larger than or equal to a threshold), the data analysis device 102 can perform at 430 the data item comparison based on a first analysis policy. If the number of data items is small (e.g., smaller than or equal to the threshold), the data analysis device 102 can perform at 440 the data item comparison based on a third analysis policy. The threshold can be set to any integer values, such as 4, 5, 7 and the like.

If the type of the received analysis request is determined to be a second type (e.g., indicating an intent of analyzing a small difference between the first and second datasets) at 410, the data analysis device 102 at 450 determines whether the number of data items is below a threshold. The determination at 450 is similar to that at 420. If the number of data items is determined to be large (e.g., larger than or equal to the threshold), the data analysis device 102 can perform at 460 the data item comparison based on a second analysis policy. If the number of data items is small (e.g., smaller than or equal to the threshold), the data analysis device 102 can perform at 440 the data item comparison based on the third analysis policy.

It should be appreciated that sequence of the steps shown in process 400 can be modified. For instance, in order to determine the analysis policy to be employed, the determination is made first based on the number of data items and then based on the type of the analysis request or based on the two aspects simultaneously. In other implementations, in addition to determining the analysis policy from the type of the analysis request and the number of data items, other criteria can also be used to determine how to compare data items corresponding to the dimension that is currently under the concern. In some examples, different comparison methods can be tried for each dimension to obtain the comparison result for determining the associated influence factors.

Example implementations of performing the data item comparison and determining the associated influence factors based on the above first to third analysis policies will be described separately below.

Figure 5:
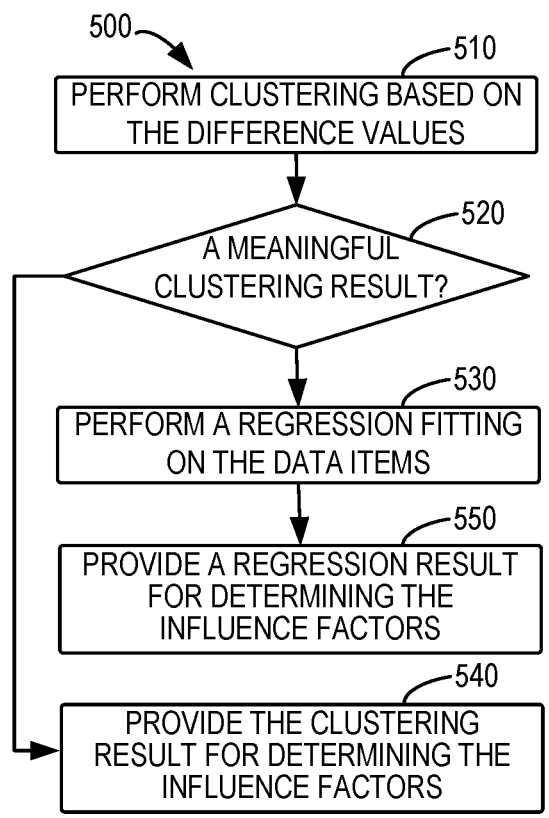
FIG. 5 illustrates a flowchart of a process of comparison based on a first analysis policy in accordance with an implementation of the subject matter described herein.

Comparison based on First Analysis Policy and Determination of Corresponding Influence Factors FIG. 5 shows a process 500 of comparison based on the first analysis policy in accordance with an implementation of the subject matter described herein. The process 500 can be regarded as a specific example of the comparison step at 430 in the process 400. According to the above description of FIG. 4, the first analysis policy focuses on analyzing more data items corresponding to a particular dimension from the user intent corresponding to the analysis requests of the first type. The first analysis policy mainly involves comparison methods of clustering and regression fitting. For the purpose of illustration, the following will mainly provide description of the comparison of data items corresponding to the first dimension in the first and second datasets. For other dimensions for which the first analysis policy may be employed, the comparison may be performed in a similar way.

At 510, the data analysis device 102 performs clustering based on difference values. Specifically, the data analysis device 102 determines difference values between data items corresponding to the first dimension in the first dataset and data items corresponding to the first dimension in the second dataset. To determine the difference values, in this implementation, the data items are numerical values. The data analysis device 102 may cluster the pairs each consisting of the determined difference values and respective values corresponding to the first dimension in the first and second datasets (i.e., the pairs of <difference value, numerical value>). Different clusters (or categories of clustering) obtained from such clustering may indicate data items in the first and second datasets that have the same or similar difference values between one dataset and a further dataset.

Still referring to FIG. 3 as an example, data items corresponding to the dimension of "movie title" in the first and second datasets are represented by $L1=\{x1, x2, \ldots xn\}$ and $L2=\{y1, y2, \ldots, yn\}$, respectively. The data analysis device 102 may determine difference values of corresponding data items bt yi'=yi-xi, where $i \in \{1, 2, \ldots, n\}$ and then obtain the difference value list $L3=\{y1', y2', \ldots, yn'\}$. Assuming that the clustering is performed by taking the lists L1 and L3 of the first dataset as pairs, each pair $\{xi, yi'\}$ is deemed as a coordinate point in a two-dimensional coordinate system with one axis of x and another axis of y'. All the pairs of the lists L1 and L3 form a scatter graph in the two-dimensional coordinate system. The coordinate points in the scatter graph can be clustered.

In some implementations, any one data item in the first and second datasets can be selected to be clustered together with the difference value. In some further implementations, users can specify data items for clustering. For example, it can determine the first dataset as the target dataset and the second dataset as the reference dataset based on user selection and users expect to analyze differences of the target dataset with respect to the reference dataset. In this case, data items of the first dataset can serve as choices of clustering and the clustering can be executed by adopting currently existing or to be developed clustering algorithms. Implementations of the subject matter described herein will not be limited in this regard.

At 520, the data analysis device 102 determines whether there is a meaningful clustering result after clustering. After clustering, the pairs (e.g., $\{xi, yi'\}$) of difference values and data items included in each cluster indicate that they have the same or similar difference values (e.g., yi') and the individual data items (e.g., xi) are also the same or similar. It can further observe whether there are abnormal <difference value, numerical value> pairs after the clustering. Here, an abnormal <difference value, numerical value> pair refers to a pair corresponding to coordinate points that cannot be clustered into one cluster having coordinate points (points in scatter graph) indicated by a majority of other pairs. That is, the abnormal <difference value, numerical value> pairs can only be classified into a certain cluster separately or with less other points (less than a particular threshold, e.g., less than 1 or 2). If there are one or more abnormal <difference value, numerical value> pairs, it means that such clustering result has a potential meaning for analyzing the difference between the first and second datasets. Therefore, the clustering result, after further analysis, may facilitate the determining of the influence factors, such as factors of positive data items, negative data items or extreme-point data items indicated by indexes 7-8 listed in Table 1. They have influence on the difference between the first and second datasets.

If presence of the meaningful clustering result is determined, the clustering result can be provided at 540 for determining the influence factors. The clustering result may indicate on or more abnormal <difference value, numerical value> pairs. When the data analysis result 102 determines the influence factors (e.g., at 230), the respective influence factors can be determined by analyzing the clustering result.

For example, if an abnormal <difference value, numerical value> pair indicates a greater difference value and there is a larger or smaller numerical value in the first dataset, it indicates that the numerical value in the first dataset is much bigger than the corresponding data item in the second dataset (due to the large difference value) and the difference between the two data items is also far greater than the difference between other data items in the two datasets (because they cannot be clustered with other difference values). Therefore, the dimension value of the first dimension corresponding to that data item in the first dataset can match with the influence factor 7 or 8, i.e., "positive data item" or "negative data item" as listed in Table 1 for instance (depending on whether there is an overall increase or decrease trend, the numerical values per se, the computation of the relative difference values in the first and second datasets).

If an abnormal <difference value, numerical value> pair indicates a smaller difference value and there is a larger or smaller numerical value in the first dataset, it can determine that the dimension value of the first dimension corresponding to the numerical value is the influence factor 9, i.e., "extreme-point data item" as listed in Table 1 for instance. The reason lies in that the numerical value (e.g., movie box office) in the pair is extremely large or small in both datasets (because of the small difference value) and is significantly different from other data items in the two datasets.

If the data analysis device 102 determines that there are no meaningful clustering results after THE clustering at 520, it indicates that the comparison based on the clustering may fail to obtain a result that can facilitate the determination of influence factors. Then, the data analysis device 102 performs a regression fitting on data items corresponding to the first dimension in the first and second datasets at 530. The regression fitting is performed on original data items rather than based on the difference values. The regression fitting can determine whether the pairs consisting of the data items of the first and second dimensions can be fitted to a straight line. The result obtained by the comparison method based on the regression fitting can be used to determine whether there are the influence factors of the three regression-related types as listed in Table 1.

For instance, in the example of FIG. 3, the respective pairs {xi, yi} in data items L1={x1, x2, . . . , xn} and L2={y1, y2, . . . , yn} corresponding to the dimension of "movie title" in the first and second datasets can be regarded as a coordinate point in a two-dimensional coordinate system formed with one axis of x and another axis of y. All pairs in the lists L1 and L3 form a scatter graph in the two-dimensional coordinate system and the regression fitting is then performed on the scatter graph.

To determine the influence factors listed in the above Table 1, different regression fitting methods can be used in the data item comparison to determine whether data items corresponding to the first dimension in the first and second datasets can be fitted to one straight line. Different regression fittings include a cross-origin regression fitting, a regression fitting with an intercept, and a regression fitting with a negative correlation. In some implementations, the data analysis device 102 can try to determine whether data items in the first and second datasets can satisfy one of the regression fittings or not.

The result of the regression fitting can be provided at 550 to determine the influence factors. In the process of determining the influence factors, if a result of cross-origin regression fitting is present, it can determine that the first and second datasets have an overall proportional increase trend in the first dimension. Therefore, the result of origin regression fitting can help determining the influence factors in the category of cross-origin regression listed in Table 1. If there is a regression fitting with an intercept, it can determine that data items corresponding to the first dimension in the first and second datasets have a fixed amount of increase or decrease indicated by the intercept, and such change is not proportional. Hence, a regression fitting with an intercept facilitates determining the influence factors in the category of general regression listed in Table 1. If there is a regression fitting of a negative correlation, it can determine that data items in the first and second datasets are negatively correlated, which may help determining influence factors from the category of negative correlation listed in Table 1. To facilitate the determination of influence factors, the fitting results provided can include a gradient of the fitted straight line (for determining a negative correlation level and a direction of the regression fitting), the intercept, the extreme points on the fitted straight line and outliers that cannot be fitted to the straight line (for determining outliers, negative outliers and positive outliers).

In addition to attempting each regression fitting one by one, for the purpose of the computational efficiency, based on the priorities of different regression fittings, it can also preferably determine a certain type of regression fitting and then select another type of regression fitting if the certain regression fitting is absent. For instance, it can first determine whether data items in the first and second datasets satisfy the cross-origin regression fitting. If there is a straight line well fitted to a cross-origin regression, a corresponding fitting result is directly provided at 550. In the absence of a satisfactory cross-origin regression fitted straight line is absent, regression fitting with intercept and/or regression fitting of negative correlation are continually performed at 530.

According to the above process described with reference to FIG. 5, a comparison result of the data items corresponding to the first dimension in the first and second datasets can be determined based on the first analysis policy. The determined comparison result can be utilized for subsequent determination of influence factors. Although the example of FIG. 5 discusses the determination of whether to perform the regression fitting or not based on the clustering result, in the first analysis policy, the corresponding clustering result and regression fitting result may also be obtained based on both the clustering and regression fitting of the difference values in other implementations. The results may all be provided for subsequent determination of one or more influence factors.

Figure 6:
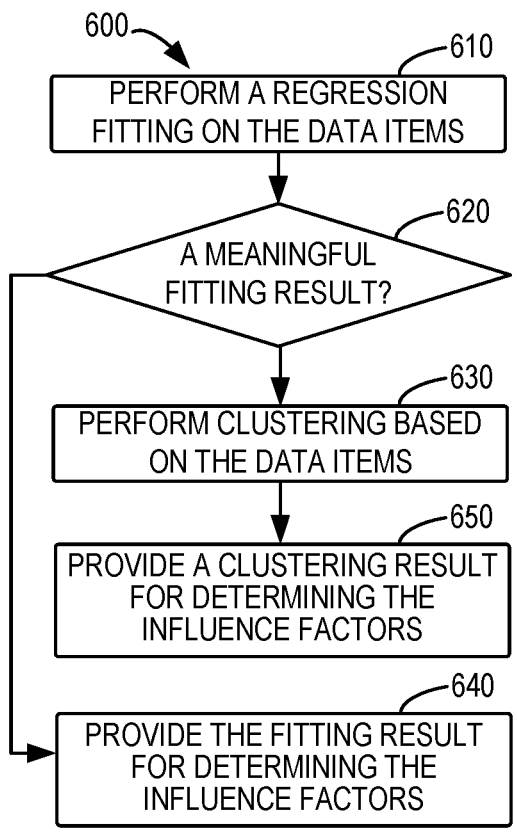
FIG. 6 illustrates a flowchart of a process of comparison based on a second analysis policy in accordance with an implementation of the subject matter described herein.

Comparison based on Second Analysis Policy and Determination of Corresponding Influence Factors FIG. 6 shows a process 600 of comparison based on the second analysis policy in accordance with an implementation of the subject matter described herein. The process 600 can be regarded as a specific example of the comparison step at 460 in the process 400. According to the above description of FIG. 4, the second analysis policy focuses on analyzing more data items corresponding to a particular dimension from the user intent corresponding to the analysis request of the second type. The second analysis policy mainly relates to comparison methods of clustering and regression fitting. Different from the first analysis policy, clustering of the second analysis policy is performed directly on the original data items rather than based on the difference values of data items. For the purpose of illustration, the following will still mainly provide description of the comparison of data items corresponding to the first dimension in the first and second datasets. For other dimensions for which the first analysis policy may be employed, the comparison may also be performed in a similar way.

At 610, the data analysis device 102 performs a regression fitting on the data items. Since the overall difference of the first and second datasets is smaller in the second analysis policy, the users may expect more to analyze whether the first and second datasets have a meaningful trend or individual data items that affect the difference from other dimensions. Therefore, the method of regression fitting is preferably considered for comparing the data items corresponding to the first dimension in the first and second datasets. The regression fitting performed at 610 is similar to the regression fitting at 530 in the above process 500, and thus will be omitted here.

At 620, the data analysis device 102 determines whether there is a meaningful fitting result. Here, a meaningful fitting result refers to a result that can be used to determine the influence factors after the regression fitting. For example, depending on the used method of regression fitting, if it is possible to fit to a certain straight line (a cross-origin straight line, a straight line with an intercept, or a straight line indicative of a negative correlation) or there are outliers that cannot be fitted to the straight line, it means that the meaningful fitting result may present. The data analysis device 102 provides the fitting result, if any, for subsequent determination of influence factors at 640. The providing of the fitting result and the subsequent determination of influence factors here are similar to 550 in the process 500 described above and thus will be omitted here.

If there are no meaningful fitting results, the data analysis device 102 continues to perform the clustering of data items at 630. Specifically, the data analysis device 102 may cluster pairs consisting of data items corresponding to the first dimension in the first dataset and respective data items corresponding to the first dimension in the second dataset (i.e., <data item 1, data item 2> pairs). For example, data items corresponding to the dimension of "movie title" in the first and second datasets are represented by L1={x1, x2, . . . , xn} and L2={y1, y2, . . . , yn}. Each pair of {xi, yi} is taken as a coordinate point in a two-dimensional coordinate system with one axis of x and another axis of y. All the pairs of the lists L1 and L2 form a scatter graph in the two-dimensional coordinate system. The respective coordinate points in the scatter graph can be clustered.

Such clustering can determine some similar and same data items in the first and second datasets and may probably identify some pairs of outlier data item. The data item pairs that cannot be clustered may indicate outlier data items in the first and/or second datasets, which may be significantly higher than other data items in the first and/or second datasets. The determination of the outlier data items can be used for determining the influence factors, such as "extreme-point data item," from the influence factors in Table 1. The data analysis device 102 may provide the clustering result at 650 for determining the influence factors. The determining is similar to 540 in the above process 500.

According to the above process described with reference to FIG. 6, a comparison result of the data items corresponding to the first dimension in the first and second datasets can be determined based on the second analysis policy. The determined comparison result can be utilized for subsequent determination of influence factors. Although the example of FIG. 6 discusses the determination of whether to perform the clustering or not based on the regression fitting result, the corresponding clustering result and regression fitting result may also be obtained based on both the clustering and regression fitting in the second analysis policy in other implementations. The results may all be provided for determining one or more influence factors.

Figure 7:
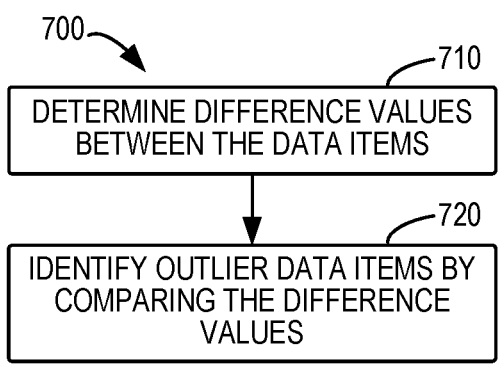
FIG. 7 illustrates a flowchart of a process of comparison based on a third analysis policy in accordance with an implementation of the subject matter described herein.

Comparison based on Third Analysis policy and Determination of Corresponding Influence Factors FIG. 7 shows a process 700 of comparison based on the third analysis policy in accordance with an implementation of the subject matter described herein. The process 700 can be regarded as a specific example of the comparison step at 440 in the process 400. The third analysis policy focuses on analyzing less data items corresponding to a particular dimension from the user intent corresponding to the analysis requests of first or second type. The third analysis policy may relate to identifying individual outlier data items for determining influence factors in the individual analysis category shown in Table 1. Since there are less data items available for comparison, the result cannot be obtained from the comparison method based on the clustering. Accordingly, there is a need for an analysis process suitable for determining outlier data items from the less data items. For the purpose of illustration, the following will provide description of the comparison of data items corresponding to the first dimension in the first and second datasets. For other dimensions for which the first analysis policy may be employed, the comparison may also be performed in a similar way.

At 710, the data analysis device 102 determines difference values between the data items corresponding to the first dimension in the first dataset and data items corresponding to the first dimension in the second dataset. At 720, the data analysis device 102 identifies outlier data items included in at least one set of the first and second datasets by comparing the difference values. In these examples, the data items used for the comparison are numerical values in the target dimension. The outlier data items may indicate significantly large or small numerical values in the datasets, or numerical values having relatively greater difference with corresponding data items in the other dataset. The outlier data items in the target dimension determined via the third analysis policy may help interpret individual data items that lead to differences between the first and second datasets from the perspective of the first dimension. The individual data items may correspond to the influence factors included in the category of individual analysis in Table 1.

In the third analysis policy, different sub-analysis policies may also be determined based on various types of analysis requests. For example, for an analysis request of the first type, a first sub-analysis policy may be used if the overall difference of the first and second datasets is large, such that the comparison result may be used for determining influence factors that explain the difference, such as the influence factors in the category of individual analysis in Table 1. For an analysis request of the second type, a second sub-analysis policy, which is different from the first sub-analysis policy, may be used for determining from the comparison result whether there still are some influence factors that explain the difference, such as influence factors in the category of individual analysis of Table 1, when the difference is small.

For the first sub-analysis policy, data items in the second dataset are directly subtracted from data items in the first dataset to calculate the difference values in the determining of the difference value at 710. For example, data items corresponding to the dimension of "movie title" in the first and second datasets are represented by L1={x1, x2, . . . , xn} and L2={y1, y2, . . . , yn} and the difference values may be calculated according to $A_i = x_i - y_i$, wherein $i \in \{1, 2, \ldots, n\}$. Then, at 720, the difference values are compared to determine whether there are any abnormal positive difference values and/or negative difference values. If yes, the data items in the first dataset and/or second dataset corresponding to the determined positive difference values and/or negative difference values are determined as outlier data items.

In determining the abnormal negative difference values, it can be determined whether the maximum difference value in all the difference values is greater than 0 and is significantly greater than other difference values (e.g., the difference with the second greatest difference value is greater than a given threshold). If the maximum difference value is greater than 0 and is significantly greater than other difference values, the data item corresponding to this difference value in the first dataset is an outlier data item. In determining the abnormal negative difference values, it can be determined whether the minimum difference value in all the difference values is smaller than 0 and is significantly smaller than other difference values (e.g., the difference with the second smallest difference value is greater than a given threshold). If the minimum difference value is smaller than 0 and is significantly smaller than other difference values, the data item in the second dataset corresponding to this difference value is an outlier data items.

Taking the dimension of "movie title" as an example, in the first and second datasets that correspond to Jul. 15, 2011 and Jul. 14, 2011, if the increase amplitude (denoted as a difference value larger than 0) of the box office revenues of movie A on the two dates is significantly greater than other movies, the box office revenue of movie A on July 15 is determined as an outlier data item. The determination of the outlier data item can be used to indicate that the data item (i.e., movie A) corresponding to the outlier data item in the dimension of "movie title" belongs to a particular influence factor, i.e., a "positive data item" in the category of individual analysis upon determining the influence factors. Similarly, if the decrease amplitude (denoted by a difference value smaller than 0) of movie A on the two dates is significantly smaller than other difference values, the box office revenue of movie A on July 14 is determined as an outlier data item. The determination of the outlier data item can be used to indicate that the data item (i.e., movie A) corresponding to the outlier data item in the dimension of "movie title" belongs to a particular influence factor, i.e., a "negative data item" in the category of individual analysis upon determining the influence factors.

For the second sub-analysis policy, a normalization value may be first determined for each of the data items corresponding to the first dimension in the second dataset upon determining the difference value at 710. For example, for the two data item lists L1={x1, x2, . . . , xn} and L2={y1, y2, . . . , yn} in the first and second datasets, the following normalization value may be determined:

$$x'_i = \frac{x_i}{x}, \text{ where } X = \sum |x_i| \quad (1)$$

$$y'_i = \frac{y_i}{x}, \text{ where } Y = \sum |y_i| \quad (2)$$

where i∈{1, 2, . . . , n}, and x'$_i$ and y'$_i$ represent normalized data items in the first and second datasets, respectively. Then, it may be determined difference values between the normalization values of data items in the first and second datasets. In comparison of the difference values, an average difference value of all difference values may be determined.

For example, the average difference value (represented as $\overline{\text{diff}}$) may be calculated as follows:

$$\overline{\text{diff}} = \frac{\sum |x'_i - y'_i|}{n} \quad (3)$$

Based on the average difference value, it can be determined whether the average difference value is greater than a threshold or not. If yes, it can be further determined whether an absolute value of the direct difference value of the data items in the first and second datasets (calculated by direct subtraction of the corresponding data items) is greater than the average difference value. If the absolute value is greater than the average difference value, it means that the data items in the two datasets are abnormal data items and the corresponding data item in the first dimension may be a particular influence factor in the category of individual analysis (it may be determined as a "positive data item" if the direct difference value is positive or a "negative data item" if the direct difference value is negative).

In some other cases, if the average difference value is not greater than the threshold, some comparison results can be determined simply based on the direct difference values of data items in the first and second datasets, to facilitate subsequent identification of some influence factors. For example, it may be determined whether an absolute value of the direct difference value of a pair of data items in the first and second datasets is significantly greater than other difference values. If such difference value exists, the corresponding data items may be determined as outlier data items. The data items corresponding to the outlier data items in the first dimension can belong to particular influence factors in the category of individual analysis. In addition, it may also be determined whether the first and second datasets have a single data item that is significantly greater or smaller than other data items in the respective datasets. This data item may also be considered as an outlier data item from which an influence factor of "extreme-point data item" in the category of individual analysis can be determined.

Presentation of Analysis Result

As discussed above, the corresponding data items in the first and second datasets can be compared from a plurality of dimensions (e.g., the first and second dimensions) in some implementations and multiple sets of influence factors can also be obtained accordingly. In some implementations, the data analysis device 102 may present the analysis result using the influence factors obtained from the respective dimensions. In some implementations, the data analysis device 102 may also determine, from the obtained influence factors, an important influence factor(s) for indicating the difference between the first and second datasets, and represent the analysis result only based on such influence factor(s). This may avoid presenting less meaningful contents to users, such that users can effectively acquire meaningful analysis results.

In some implementations, weights may be assigned to the predefined influence factors. A weight for each influence factor may indicate the importance of the influence factor in explaining the difference between the two datasets. A greater weight may be assigned to an influence factor that can better explain the difference and a smaller weight is assigned to a less important influence factor. The weight assignment may be pre-configured or specified by users. The data analysis device 102 may determine, based on the weights, the importance of a set of influence factors associated with each dimension with respect to the differences between the first and second datasets. Then, one or more sets of influence factors for determining analysis results are determined based on the corresponding importance.

In some implementations, since different types of analysis requests indicate different user intents and also affect the determination of the influence factors in the comparison process, the weight assignment for each influence factor may also be based on the different types of analysis requests. For the different types of analysis requests, the importance of one or more influence factors for explaining difference may vary and different weights will be assigned accordingly. If a set of influence factors associated with a certain dimension is related to a corresponding type of analysis request, the overall importance for the set of influence factors may be determined based on weights of the influence factors corresponding to that type of analysis request.

Take influence factors listed in the above Table 1 as an example. In an example, for the first type of analysis request, the weight for each of the influence factors (indexes 0 to 9) in Table 1 may be determined according to the importance in explaining the reasons for the difference. In one example, the weights for the influence factors of indexes 0 to 9 are ranked as below: $2 \approx 7 > 4 \approx 9 > 5 > 3 \approx 8 > 6 > 0 > 1$. As a specific example, the value of each influence factor for the first type of analysis requests is indicated as Table 3 below:

TABLE 3

Example weights of influence factors for the first type of analysis requests

| Index of influence factor | 2 | 7 | 4 | 9 | 5 | 3 | 8 | 6 | 0 | 1 |
|---|---|---|---|---|---|---|---|---|---|---|
| Weight | 0.9 | 0.9 | 0.7 | 0.7 | 0.5 | 0.4 | 0.4 | 0.2 | 0.1 | 0.1 |

In the example of Table 3, the influence factors identified by indexes 2 and 7 in Table 1 may directly explain the larger overall difference of the first and second datasets, thereby having higher weights. The influence factors identified by indexes 4 and 9 may also explain the difference amount, but they specifically point out the data items having larger numerical values in the first and/or second datasets. The influence factor identified by index 5 may explain a general trend in the first and second datasets, such as an increase trend and a decrease trend. The influence factors identified by indexes 3 and 8 may be irrelevant to the overall difference of the first and second datasets, but they can indicate the individual data items with abnormal behaviors with respect to the overall difference of increase or decrease, e.g., the example of index 3 as provided in Table 2. The influence factor identified by index 6 may provide further information about the general trend. The influence factor identified by index 0 may fail to explain the trend when there is a general increase trend from one dataset to the other dataset, but it can explain an abnormal fact that is conflict with the increase trend in a given dimension, in which the users may also be interested. The influence factor identified by index 1 can supplement the information related to the perspective of index 0.

In a further example, for the second type of analysis requests, the weight for each of the influence factors (indexes 0 to 9) in Table 1 may be determined according to the importance in explaining the reasons for the difference. In the example, the weight of one or more influence factors may vary as compared with the first type of analysis requests, so as to represent the different importance of influence factors for the difference between the first and second datasets in the case of the second type of analysis requests. In one example, the weights for the influence factors of indexes 0 to 9 are ranked as below: $2 \approx 3 \approx 7 \approx 8 > 0 \approx 1 > 4 \approx 9 > 5 \approx 6$. As a specific example, the value of each influence factor for the second type of analysis requests is provided as Table 4 below:

TABLE 4

Example weights of influence factors for the second type of analysis requests

| Index of influence factor | 2 | 3 | 7 | 8 | 0 | 1 | 4 | 9 | 5 | 6 |
|---|---|---|---|---|---|---|---|---|---|---|
| Weight | 0.9 | 0.9 | 0.9 | 0.9 | 0.8 | 0.8 | 0.5 | 0.5 | 0.1 | 0.1 |

In the example of Table 4, because there is no apparent increase amplitude between two data items corresponding to a defined third dimension in the first and second datasets, the influence factors identified by indexes 2, 3, 7 and 8 can directly explain some positive or negative outliers or individual data items that lead to a small overall difference of the two datasets. The influence factors identified by indexes 0 and 1 may also provide information related to the small overall difference of the datasets. The influence factors identified by indexes 4 and 9 indicate larger numerical values in the presence or absence of the regression fitting. The influence factors identified by indexes 5 and 6 may indicate a trend of the majority of data items in the two datasets.

In an example implementation, for different sets of influence factors associated with various dimensions, the importance of the influence factors for the difference between the two datasets may be determined based on their respective weights. In some implementations, the more the influence factors are determined from a given dimension, the greater the determined importance is. For example, weights for the influence factors in a set of influence factors associated with each dimension can be summed up and the obtained sum may be used as the overall importance of the set of influence factors. In some further implementations, the importance determined for the influence factors associated with each dimension may be limited within a specific scope (e.g., within the scope of 0 to 1). For instance, importance of a given dimension can be determined according to the following equation:

$$\mathrm{Im}_i = 1 - \Pi(1 - p_{ij}) \quad (4)$$

where $\mathrm{Im}_i$ represents the importance determined for a set of influence factors associated with the i-th dimension, and $p_{ij}$ represents the weight of the j-th influence factor in a set of influence factors associated with the i-th dimension. In Equation (4), the range of i depends on the number of dimensions used for analysis of the first and second datasets in the step of comparison and the determination of the influence factors, and the value of j is related to the number of influence factors determined for the i-th dimension. The values of i and j are greater than or equal to 1.

In some implementations, after determining the importance for each set of influence factors associated with each of a plurality of dimensions, the data analysis device 102 may select one or more sets of influence factors according to the importance for presenting the analysis result. For example, some sets of influence factors with high importance (e.g., first k sets of influence factors) may be selected for presenting the analysis result. The importance levels may be compared with a threshold and only influence factors having importance levels greater than the threshold may be selected for presenting the analysis result. In some implementations, the users may set the number of dimensions to be selected with which the sets of influence factors are associated (i.e., setting k value) or set the total number of individual influence factors to be selected. In these implementations, the influence factors for presenting the analysis result may be determined based on the user settings.

The above discusses determining which influence factors of the sets of influence factors associated with a plurality of dimensions can be used for presenting the analysis result based on weights of the influence factors. In some other implementations, the determination of importance and the selection of influence factors may not be performed on the basis of the dimensions. Instead, one or more influence factors for presenting the analysis result can be selected based on the weights for the different influence factors per se that are determined for the dimensions. Alternatively, or in addition, the users may also specify one or more dimensions they are interested in and the determined influence factors associated with the dimensions are at least taken in account when presenting the analysis result.

In some implementations, the data analysis device 102 may present, based on the determined influence factors, an analysis result related to the difference between the first and second datasets to the users. Depending on the determined influence factors, the analysis result may include specific values or data items (e.g., the influence factors corresponding to indexes 1-4 and 7-9 in Table 1), the increase or decrease trend (e.g., the influence factors corresponding to indexes 0 and 5 in Table 1) and/or a fixed value of increase or decrease (e.g., the influence factors corresponding to indexes 1 and 6 in Table 1) indicated by the influence factors. Examples of the analysis result can refer to examples of each influence factor listed with reference to FIG. 2.

Figure 8:
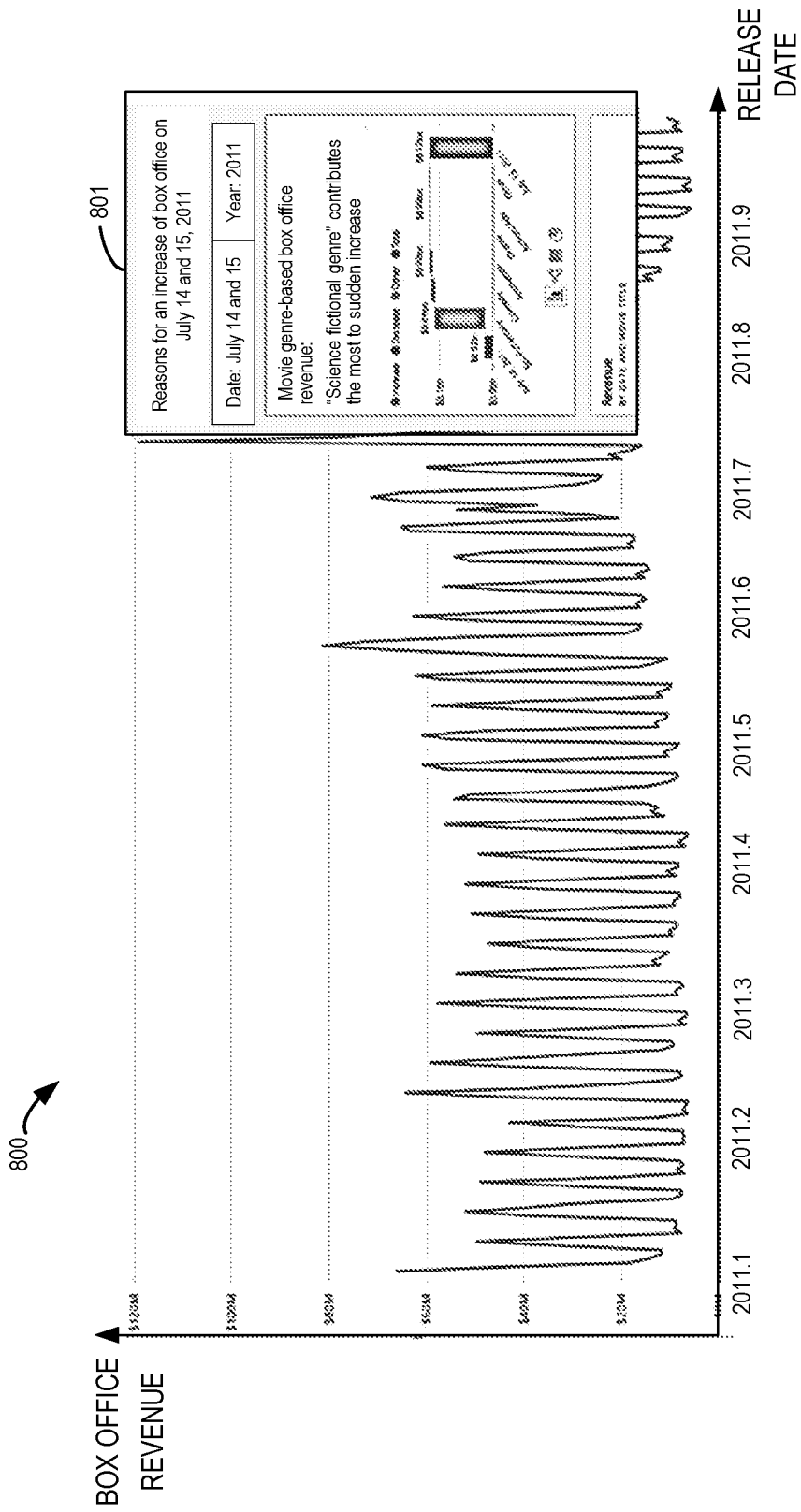
FIG. 8 illustrates a schematic diagram of presentation of an analysis result in accordance with an implementation of the subject matter described herein.

The analysis result may be presented in one or more forms of text, graph, video, audio, image, and the like. FIG. 8 provides an example of a presentation of analysis result 800. In this example, after the user indicates a request for analyzing box office revenues on different dates in the plot of FIG. 3, the analysis result 801 may be presented to the user. The analysis result 801 indicates, in the form of graph and text, to the user that the reason for a sudden increase of box office on Jul. 15, 2011 as compared with the day before is that: in all the movie genres, a growth of science fiction movies contribute the most to the sudden increase.

According to the above example implementations of the subject matter described herein, it is possible to achieve an automatic analysis solution for differences between different datasets. It would be appreciated that although the analysis of the two datasets has been described above, it may also request for analyzing differences between three or more datasets of a multi-dimensional dataset. During the analysis process, the reasons for the relative difference between any two datasets in the three or more datasets can be determined according to the above example implementations, so as to determine different influence factors for explaining the differences. The obtained influence factors can be clustered to present the analysis results related to differences between the datasets.

Example Implementations

Some example implementations of the subject matter described herein are listed below.

In one aspect, the subject matter described herein provides a computer-implemented method. The method comprises: receiving an analysis request for a first dataset and a second dataset, each of the first and second datasets including data items corresponding to a plurality of dimensions; in response to the analysis request, comparing the data items corresponding to a first dimension of the plurality of dimensions in the first and second datasets; determining, based on the comparison, a first set of influence factors associated with the first dimension, each of the first set of influence factors indicating a reason for a difference between the first and second datasets from a respective perspective; and presenting, based at least in part on the first set of influence factors, an analysis result related to the difference between the first and second datasets.

In some implementations, presenting an analysis result related to the difference between the first and second datasets further comprises: further comparing the data items corresponding to a second dimension of the plurality of dimensions in the first and second datasets; determining, based on the further comparison, a second set of influence factors associated with the second dimension, each of the second set of influence factors indicating a reason for the difference between the first and second datasets from a respective perspective; determining at least one set of the first and second sets of influence factors; and presenting, based on the determined at least one set of influence factors, the analysis result for the first and second datasets.

In some implementations, determining at least one set of the first and second sets of influence factors comprises: determining, based on a first set of predetermined weights assigned to the first set of influence factors, first importance of the first set of influence factors with respect to the difference; determining, based on a second set of predetermined weights assigned to the second set of influence factors, second importance of the second set of influence factors with respect to the difference; and determining, based on the first and second importance, the at least one set of the first and second sets of influence factors.

In some implementations, the first and second sets of predetermined weights are associated with a type of the analysis request.

In some implementations, comparing the data items corresponding to the first dimension in the first and second datasets comprises: determining an analysis policy based on at least one of: a type of the analysis request, and the number of the data items corresponding to the first dimension in the first or second dataset; and comparing, based on the analysis policy, different data items corresponding to the first dimension in the first and second datasets to determine the first set of influence factors associated with the first dimension.

In some implementations, comparing the data items corresponding to the first dimension in the first and second datasets comprises: clustering the data items corresponding to the first dimension in the first and second datasets.

In some implementations, the data items include numerical values, and wherein clustering the data items corresponding to the first dimension in the first and second datasets comprises: determining difference values between the numerical values corresponding to the first dimension in the first dataset and the numerical values corresponding to the first dimension in the second dataset; and clustering pairs of the difference values and the numerical values corresponding to the first dimension in the first or second dataset.

In some implementations, clustering the data items corresponding to the first dimension in the first and second datasets comprises: clustering pairs of the respective data items corresponding to the first dimension in the first dataset and the respective data items corresponding to the first dimension in the second dataset.

In some implementations, comparing the data items corresponding to the first dimension in the first and second datasets comprises: determining a regression fitting between the data items corresponding to the first dimension in the first dataset and the data items corresponding to the first dimension in the second dataset.

In some implementations, the regression fitting is selected from a group consisting of a cross-origin regression fitting, a regression fitting with an intercept, and a regression fitting with a negative correlation.

In some implementations, the data items include numerical values. In these implementations, comparing the data items corresponding to the first dimension in the first and second datasets comprises: determining difference values between the numerical values corresponding to the first dimension in the first dataset and the numerical values corresponding to the first dimension in the second dataset; and identifying outlier data items included in at least one set of the first and second datasets by comparing the difference values.

In another aspect, the subject matter described herein provides a device, comprising: a processing unit; and a memory coupled to the processing unit and having instructions stored thereon which, when executed by the processing unit, perform acts of: receiving an analysis request for a first dataset and a second dataset, each of the first and second datasets including data items corresponding to a plurality of dimensions; in response to the analysis request, comparing the data items corresponding to a first dimension of the plurality of dimensions in the first and second datasets; determining, based on the comparison, a first set of influence factors associated with the first dimension, each of the first set of influence factors indicating a reason for a difference between the first and second datasets from a respective perspective; and presenting, based at least in part on the first set of influence factors, an analysis result related to the difference between the first and second datasets.

In some implementations, presenting an analysis result related to the difference between the first and second datasets further comprises: further comparing the data items corresponding to a second dimension of the plurality of dimensions in the first and second datasets; determining, based on the further comparison, a second set of influence factors associated with the second dimension, each of the second set of influence factors indicating a reason for the difference between the first and second datasets from a respective perspective; determining at least one set of the first and second sets of influence factors; and presenting, based on the determined at least one set of influence factors, the analysis result for the first and second datasets.

In some implementations, determining at least one set of the first and second sets of influence factors comprises: determining, based on a first set of predetermined weights assigned to the first set of influence factors, first importance of the first set of influence factors with respect to the difference; determining, based on a second set of predetermined weights assigned to the second set of influence factors, second importance of the second set of influence factors with respect to the difference; and determining, based on the first and second importance, the at least one set of the first and second sets of influence factors.

In some implementations, the first and second sets of predetermined weights are associated with a type of the analysis request.

In some implementations, comparing the data items corresponding to the first dimension in the first and second datasets comprises: determining an analysis policy based on at least one of: a type of the analysis request, and the number of the data items corresponding to the first dimension in the first or second dataset; and comparing, based on the analysis policy, different data items corresponding to the first dimension in the first and second datasets to determine the first set of influence factors associated with the first dimension.

In some implementations, comparing the data items corresponding to the first dimension in the first and second datasets comprises: clustering the data items corresponding to the first dimension in the first and second datasets.

In some implementations, data items include numerical values. In these implementations, clustering the data items corresponding to the first dimension in the first and second datasets comprises: determining difference values between the numerical values corresponding to the first dimension in the first dataset and the numerical values corresponding to the first dimension in the second dataset; and clustering pairs of the difference values and the numerical values corresponding to the first dimension in the first or second dataset.

In some implementations, clustering the data items corresponding to the first dimension in the first and second datasets comprises: clustering pairs of the respective data items corresponding to the first dimension in the first dataset and the respective data items corresponding to the first dimension in the second dataset.

In some implementations, comparing the data items corresponding to the first dimension in the first and second datasets comprises: determining a regression fitting between the data items corresponding to the first dimension in the first dataset and the data items corresponding to the first dimension in the second dataset.

In some implementations, the regression fitting is selected from a following set consisting of: cross-origin regression fitting, regression fitting with intercept and regression fitting of negative correlation.

In some implementations, data items include numerical values. In these implementations, comparing the data items corresponding to the first dimension in the first and second datasets comprises: determining difference values between the numerical values corresponding to the first dimension in the first dataset and the numerical values corresponding to the first dimension in the second dataset; and identifying outlier data items included in at least one set of the first and second datasets by comparing the difference values.

In a further aspect, the subject matter described herein provides a computer program product stored in a non-transient computer storage medium and including machine-executable instructions which, when executed by a device, cause the device to: receive an analysis request for a first dataset and a second dataset, each of the first and second datasets including data items corresponding to a plurality of dimensions; in response to the analysis request, compare the data items corresponding to a first dimension of the plurality of dimensions in the first and second datasets; determine, based on the comparison, a first set of influence factors associated with the first dimension, each of the first set of influence factors indicating a reason for a difference between the first and second datasets from a respective perspective; and present, based at least in part on the first set of influence factors, an analysis result related to the difference between the first and second datasets.

In some implementations, the machine-executable instructions, when executed by the device, cause the device to: further compare the data items corresponding to a second dimension of the plurality of dimensions in the first and second datasets; determine, based on the further comparison, a second set of influence factors associated with the second dimension, each of the second set of influence factors indicating a reason for the difference between the first and second datasets from a respective perspective; determine at least one set of the first and second sets of influence factors; and present, based on the determined at least one set of influence factors, the analysis result for the first and second datasets.

In some implementations, the machine-executable instructions, when executed by the device, cause the device to: determine, based on a first set of predetermined weights assigned to the first set of influence factors, first importance of the first set of influence factors with respect to the difference; determine, based on a second set of predetermined weights assigned to the second set of influence factors, second importance of the second set of influence factors with respect to the difference; and determine, based on the first and second importance, the at least one set of the first and second sets of influence factors.

In some implementations, the first and second sets of predetermined weights are associated with a type of the analysis request.

In some implementations, the machine-executable instructions, when executed by the device, cause the device to: determine an analysis policy based on at least one of: a type of the analysis request, and the number of the data items corresponding to the first dimension in the first or second dataset; and compare, based on the analysis policy, different data items corresponding to the first dimension in the first and second datasets to determine the first set of influence factors associated with the first dimension.

In some implementations, the machine-executable instructions, when executed by the device, cause the device to: cluster the data items corresponding to the first dimension in the first and second datasets.

In some implementations, the data items include numerical values. In these implementations, the machine-executable instructions, when executed by the device, cause the device to: determine difference values between the numerical values corresponding to the first dimension in the first dataset and the numerical values corresponding to the first dimension in the second dataset; and clustering pairs of the difference values and the numerical values corresponding to the first dimension in the first or second dataset.

In some implementations, the machine-executable instructions, when executed by the device, cause the device to: cluster pairs of the respective data items corresponding to the first dimension in the first dataset and the respective data items corresponding to the first dimension in the second dataset.

In some implementations, the machine-executable instructions, when executed by the device, cause the device to: determine a regression fitting between the data items corresponding to the first dimension in the first dataset and the data items corresponding to the first dimension in the second dataset.

In some implementations, the regression fitting is selected from a group consisting of a cross-origin regression fitting, a regression fitting with an intercept, and a regression fitting with a negative correlation.

In some implementations, the data items include numerical values. In these implementations, the machine-executable instructions, when executed by the device, cause the device to: determine difference values between the numerical values corresponding to the first dimension in the first dataset and the numerical values corresponding to the first dimension in the second dataset; and identifying outlier data items included in at least one set of the first and second datasets by comparing the difference values.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
   receiving an analysis request for a first dataset and a second dataset, each of the first and second datasets including data items corresponding to a plurality of dimensions;
   in response to the analysis request, comparing the data items corresponding to a first dimension of the plurality of dimensions in the first and second datasets;
   determining, based on the comparison, a first set of influence factors associated with the first dimension, each of the first set of influence factors indicating a reason for a difference between the first and second datasets from a respective perspective of the first dimension; and
   presenting, based at least in part on the first set of influence factors, an analysis result related to the difference between the first and second datasets, wherein presenting an analysis result related to the difference between the first and second datasets further comprises:
      further comparing the data items corresponding to a second dimension of the plurality of dimensions in the first and second datasets;
      determining, based on the further comparison, a second set of influence factors associated with the second dimension, each of the second set of influence factors indicating a reason for the difference between the first and second datasets from a respective perspective;
      determining at least one set of the first and second sets of influence factors; and
      presenting, based on the determined at least one set of influence factors, the analysis result for the first and second datasets.

2. The method of claim 1, wherein determining at least one set of the first and second sets of influence factors comprises:
   determining, based on a first set of predetermined weights assigned to the first set of influence factors, first importance of the first set of influence factors with respect to the difference;
   determining, based on a second set of predetermined weights assigned to the second set of influence factors, second importance of the second set of influence factors with respect to the difference; and
   determining, based on the first and second importance, the at least one set of the first and second sets of influence factors.

3. The method of claim 2, wherein the first and second sets of predetermined weights are associated with a type of the analysis request.

4. The method of claim 1, wherein comparing the data items corresponding to the first dimension in the first and second datasets comprises:
   determining an analysis policy based on at least one of:
      a type of the analysis request, and
      the number of the data items corresponding to the first dimension in the first or second dataset; and
   comparing, based on the analysis policy, different data items corresponding to the first dimension in the first and second datasets to determine the first set of influence factors associated with the first dimension.

5. The method of claim 1, wherein comparing the data items corresponding to the first dimension in the first and second datasets comprises:
   clustering the data items corresponding to the first dimension in the first and second datasets.

6. The method of claim 5, wherein the data items include numerical values, and wherein clustering the data items corresponding to the first dimension in the first and second datasets comprises:
   determining difference values between the numerical values corresponding to the first dimension in the first dataset and the numerical values corresponding to the first dimension in the second dataset; and
   clustering pairs of the difference values and the numerical values corresponding to the first dimension in the first or second dataset.

7. The method of claim 5, wherein clustering the data items corresponding to the first dimension in the first and second datasets comprises:
   clustering pairs of the respective data items corresponding to the first dimension in the first dataset and the respective data items corresponding to the first dimension in the second dataset.

8. The method of claim 1, wherein comparing the data items corresponding to the first dimension in the first and second datasets comprises:
   determining a regression fitting between the data items corresponding to the first dimension in the first dataset and the data items corresponding to the first dimension in the second dataset.

9. The method of claim 1, wherein the data items include numerical values, and wherein comparing the data items corresponding to the first dimension in the first and second datasets comprises:
   determining difference values between the numerical values corresponding to the first dimension in the first dataset and the numerical values corresponding to the first dimension in the second dataset; and
   identifying outlier data items included in at least one set of the first and second datasets by comparing the difference values.

10. The method of claim 1, wherein the analysis result presents, in the form of graph and text, the reason for the difference between the first and second datasets.

11. A device comprising:
    a processing unit; and
    a memory coupled to the processing unit and having instructions stored thereon which, when executed by the processing unit, perform acts of:
       receiving an analysis request for a first dataset and a second dataset, each of the first and second datasets including data items corresponding to a plurality of dimensions;
       in response to the analysis request, comparing the data items corresponding to a first dimension of the plurality of dimensions in the first and second datasets;
       determining, based on the comparison, a first set of influence factors associated with the first dimension, each of the first set of influence factors indicating a reason for a difference between the first and second datasets from a respective perspective of the first dimension; and
       presenting, based at least in part on the first set of influence factors, an analysis result related to the difference between the first and second datasets, wherein presenting an analysis result related to the difference between the first and second datasets further comprises:
          further comparing the data items corresponding to a second dimension of the plurality of dimensions in the first and second datasets;

determining, based on the further comparison, a second set of influence factors associated with the second dimension, each of the second set of influence factors indicating a reason for the difference between the first and second datasets from a respective perspective;

determining at least one set of the first and second sets of influence factors; and presenting, based on the determined at least one set of influence factors, the analysis result for the first and second datasets.

12. The device of claim 11, wherein comparing the data items corresponding to the first dimension in the first and second datasets comprises:

determining an analysis policy based on at least one of:
a type of the analysis request, and
the number of the data items corresponding to the first dimension in the first or second dataset; and comparing, based on the analysis policy, different data items corresponding to the first dimension in the first and second datasets to determine the first set of influence factors associated with the first dimension.

13. The device of claim 11, wherein comparing the data items corresponding to the first dimension in the first and second datasets comprises:

clustering the data items corresponding to the first dimension in the first and second datasets.

14. A computer program product stored in a non-transient computer storage medium and including machine-executable instructions which, when executed by a device, cause the device to:

receive an analysis request for a first dataset and a second dataset, each of the first and second datasets including data items corresponding to a plurality of dimensions;

in response to the analysis request, compare the data items corresponding to a first dimension of the plurality of dimensions in the first and second datasets;

determine, based on the comparison, a first set of influence factors associated with the first dimension, each of the first set of influence factors indicating a reason for a difference between the first and second datasets from a respective perspective of the first dimension; and present, based at least in part on the first set of influence factors, an analysis result related to the difference between the first and second datasets, wherein presenting an analysis result related to the difference between the first and second datasets further comprises:

further compare the data items corresponding to a second dimension of the plurality of dimensions in the first and second datasets;

determine, based on the further comparison, a second set of influence factors associated with the second dimension, each of the second set of influence factors indicating a reason for the difference between the first and second datasets from a respective perspective;

determine at least one set of the first and second sets of influence factors; and present, based on the determined at least one set of influence factors, the analysis result for the first and second datasets.

15. The computer program product of claim 14, wherein comparing the data items corresponding to the first dimension in the first and second datasets comprises:

determining an analysis policy based on at least one of:
a type of the analysis request, and
the number of the data items corresponding to the first dimension in the first or second dataset; and comparing, based on the analysis policy, different data items corresponding to the first dimension in the first and second datasets to determine the first set of influence factors associated with the first dimension.

16. The computer program product of claim 14, wherein comparing the data items corresponding to the first dimension in the first and second datasets comprises:

clustering the data items corresponding to the first dimension in the first and second datasets.

17. The computer program product of claim 16, wherein the data items include numerical values, and wherein clustering the data items corresponding to the first dimension in the first and second datasets comprises:

determining difference values between the numerical values corresponding to the first dimension in the first dataset and the numerical values corresponding to the first dimension in the second dataset; and clustering pairs of the difference values and the numerical values corresponding to the first dimension in the first or second dataset.

18. The computer program product of claim 16, wherein clustering the data items corresponding to the first dimension in the first and second datasets comprises:

clustering pairs of the respective data items corresponding to the first dimension in the first dataset and the respective data items corresponding to the first dimension in the second dataset.

19. The computer program product of claim 14, wherein the analysis result presents, in the form of graph and text, the reason for the difference between the first and second datasets.

20. The computer program product of claim 14, wherein the data items include numerical values, and wherein comparing the data items corresponding to the first dimension in the first and second datasets comprises:

determining difference values between the numerical values corresponding to the first dimension in the first dataset and the numerical values corresponding to the first dimension in the second dataset; and identifying outlier data items included in at least one set of the first and second datasets by comparing the difference values.

* * * * *